US012783453B2

(12) United States Patent
Ge et al.

(10) Patent No.: US 12,783,453 B2
(45) Date of Patent: Nov. 3, 2026

(54) METHOD AND APPARATUS FOR PROCESSING CLOCK STRETCHING IN TRANSPARENT TRANSMISSION MODE OF INTEGRATED CIRCUIT BUS

(71) Applicant: Suzhou MetaBrain Intelligent Technology Co., Ltd., Suzhou (CN)

(72) Inventors: Zhihua Ge, Suzhou (CN); Lianpeng Zhai, Suzhou (CN); Haibo Wang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/142,716

(22) PCT Filed: Sep. 11, 2024

(86) PCT No.: PCT/CN2024/118335
§ 371 (c)(1),
(2) Date: Jun. 24, 2025

(87) PCT Pub. No.: WO2025/123818
PCT Pub. Date: Jun. 19, 2025

(65) Prior Publication Data

US 2026/0119445 A1 Apr. 30, 2026

(30) Foreign Application Priority Data

Dec. 13, 2023 (CN) ........................ 202311708718.1

(51) Int. Cl.
*G06F 13/42* (2006.01)
*G06F 13/38* (2006.01)
*G06F 13/40* (2006.01)

(52) U.S. Cl.
CPC ................................ *G06F 13/4291* (2013.01)

(58) Field of Classification Search
CPC .................................................. G06F 13/4291
(Continued)

(56) References Cited

U.S. PATENT DOCUMENTS 5,627,858 A * 5/1997 Mak .................... H04L 25/0262 375/220
11,709,787 B2 * 7/2023 Zhai .................... G06F 13/1668 710/5

(Continued)

FOREIGN PATENT DOCUMENTS

CN 104991876 A 10/2015
CN 105095139 A 11/2015

(Continued)

OTHER PUBLICATIONS

International Search Report of corresponding PCT application (PCT/CN2024/118335) Nov. 4, 2024, 6 pages.

(Continued)

*Primary Examiner* — Idriss N Alrobaye
*Assistant Examiner* — Henry W Yu
(74) *Attorney, Agent, or Firm* — COOPER LEGAL GROUP LLC

(57) ABSTRACT

A method and an apparatus for processing clock stretching in a transparent transmission mode of an integrated circuit bus. The method includes: obtaining target data transmitted by a master device to a slave device based on a first integrated circuit bus; detecting, according to the target data, whether the master device has already completed sending a byte of data to the slave device; confirming, in response to determining that the master device has already completed sending the byte of data to the slave device, that the master device is about to send an acknowledge character bit to the slave device; and taking over the first integrated circuit bus between the master device and the slave device, disabling a (Continued)

transparent transmission mode between the master device and the slave device, and controlling the master device and/or the slave device.

20 Claims, 7 Drawing Sheets

(58) Field of Classification Search
USPC ............. 710/5–6, 14–15, 29, 32–33, 36, 110
See application file for complete search history.

(56) References Cited

U.S. PATENT DOCUMENTS

2002/0001287 A1* 1/2002 Bergenwall ........... H04L 1/1809
370/468
2004/0078494 A1* 4/2004 Lennox ..................... H04J 3/04
710/1
2004/0179520 A1* 9/2004 Fattaruso ............. H03K 3/2885
370/366
2011/0179207 A1* 7/2011 Yao ....................... G06F 13/382
710/110

FOREIGN PATENT DOCUMENTS

| | | | |
|---|---|---|---|
| CN | 113656340 | A | 11/2021 |
| CN | 117407343 | A | 1/2024 |
| WO | 2015169038 | A1 | 11/2015 |
| WO | 2023019753 | A1 | 2/2023 |

OTHER PUBLICATIONS

Written Opinion of International Searching Authority of corresponding PCT application (PCT/CN2024/118335) Nov. 4, 2024, 9 pages.
Notification to Grant Patent Right for Invention of corresponding CN priority application (CN202311708718.1) Jan. 19, 2024, 3 pages.

* cited by examiner

METHOD AND APPARATUS FOR PROCESSING CLOCK STRETCHING IN TRANSPARENT TRANSMISSION MODE OF INTEGRATED CIRCUIT BUS

CROSS-REFERENCE TO RELATED APPLICATION

This application claims priority to Chinese Patent Application No. 202311708718.1 filed with the China National Intellectual Property Administration on Dec. 13, 2023 and entitled "Method and Apparatus for Processing Clock Stretching in Transparent Transmission Mode of Integrated Circuit Bus", which is incorporated herein by reference in its entirety.

FIELD

The present application relates to the field of computer technologies, and in particular, to a method and an apparatus for processing clock stretching in a transparent transmission mode of an integrated circuit bus.

BACKGROUND

In a server machine, an integrated circuit bus signal is usually used for a Board Management Controller (BMC) on a board to access devices, such as a temperature sensor, a fan controller, a backplane, and a peripheral component interconnect express (PCIe) expansion card. The BMC manages a foregoing device in a polling manner. The BMS serves as a master device of the integrated circuit bus signal, and another device services as a slave device. When the slave device is in a busy state and may not immediately respond to an access of an integrated circuit bus of the BMC, a serial data line signal of the integrated circuit bus will be actively pulled down to pause polling of the integrated circuit bus. After the slave device exits the busy state, the serial data line signal is released to response the access of the integrated circuit bus again. This process is clock stretching of the integrated circuit bus.

The clock stretching of the integrated circuit bus is divided into a byte level and a bit level. The byte level is a process that the slave device pulls down the serial data line signal after receiving complete byte data or a command, which is configured to process received data internally from the slave device. The bit level is mainly used for a case in which a serial data line signal rate of the integrated circuit bus supported by the slave device is lower than a serial data line signal rate sent by the master device, and the slave device pulls down the serial data line signal to reduce an actual serial data line signal rate.

In an actual hardware design, rates that all slave devices may support are comprehensively considered when the serial data line signal rate of the master device is selected, so bit-level clock stretching may not occur. Common is byte-level clock stretching. However, the byte-level clock stretching may cause short pulses generated on a first serial clock line signal corresponding to the master device and a second serial clock line signal corresponding to the slave device on the serial data line signal, which does not comply with a communication protocol and affects normal communication between the master device and the slave device.

SUMMARY

According to a first aspect, the present application provides a method for processing clock stretching in a transparent transmission mode of an integrated circuit bus, which is applied to a complex programmable logic device. The method includes:

obtaining target data transmitted by a master device to a slave device based on a first integrated circuit bus;

detecting, according to the target data, whether the master device has already completed sending a byte of data to the slave device;

confirming, in response to determining that the master device has already completed sending the byte of data to the slave device, that the master device is about to send an acknowledge character bit to the slave device; and taking over the first integrated circuit bus between the master device and the slave device, disabling a transparent transmission mode between the master device and the slave device, and controlling the master device and/or the slave device.

In some implementations, the taking over the first integrated circuit bus between the master device and the slave device, disabling a transparent transmission mode between the master device and the slave device, and controlling the master device and/or the slave device includes:

controlling, based on a second integrated circuit bus between the complex programmable logic device and the master device, the master device to be in a waiting state;

detecting, based on a third integrated circuit bus between the complex programmable logic device and the slave device, whether the slave device enters a clock stretching state to obtain a first detection result; and control the master device and/or the slave device according to the first detection result.

In some implementations, the controlling, based on a second integrated circuit bus between the complex programmable logic device and the master device, the master device to be in a waiting state includes:

controlling, based on the second integrated circuit bus between the complex programmable logic device and the master device, the master device to enter the clock stretching state, and pulling down a first serial clock line signal corresponding to the master device to enable the master device to be in the waiting state.

In some implementations, the detecting, based on a third integrated circuit bus between the complex programmable logic device and the slave device, whether the slave device enters a clock stretching state to obtain a first detection result includes:

continuously pulling up a second serial clock line signal corresponding to the slave device, and sending a third serial clock line signal corresponding to the acknowledge character bit to the slave device;

detecting whether the second serial clock line signal corresponding to the slave device is at a high level to obtain a second detection result; and determining, according to the second detection result, whether the slave device enters the clock stretching state to obtain the first detection result.

In some implementations, the determining, according to the second detection result, whether the slave device enters the clock stretching state to obtain the first detection result includes:

determining, in response to determining that the second detection result is that the second serial clock line signal corresponding to the slave device is at the high level, that the slave device does not enter the clock stretching state or the slave device has already exited the clock stretching state to obtain the first detection result.

In some implementations, the method further includes:

determining, in response to determining that the second detection result is that the second serial clock line signal corresponding to the slave device is at a low level, that the slave device enters the clock stretching state to obtain the first detection result.

In some implementations, the controlling the master device and/or the slave device according to the first detection result includes:

starting a timeout timer in response to determining that the first detection result is that the slave device enters the clock stretching state, where the timeout timer is preset with a preset duration;

detecting, based on the timeout timer, whether a time for the slave device to enter the clock stretching state exceeds the preset duration to obtain a third detection result; and controlling the master device and/or the slave device according to the third detection result.

In some implementations, the detecting, based on the timeout timer, whether a time for the slave device to enter the clock stretching state exceeds the preset duration to obtain a third detection result includes:

continuously detecting whether the second serial clock line signal corresponding to the slave device changes to a high level within the preset duration to obtain a fourth detection result; and determining, according to the fourth detection result, whether the time for the slave device to enter the clock stretching state exceeds the preset duration to obtain the third detection result.

In some implementations, the determining, according to the fourth detection result, whether the time for the slave device to enter the clock stretching state exceeds the preset duration to obtain the third detection result includes:

determining, in response to determining that the fourth detection result is that the second serial clock line signal corresponding to the slave device changes to a high level within the preset duration, that the time for the slave device to enter the clock stretching state does not exceed the preset duration to obtain the third detection result.

In some implementations, the method further includes:

determining, in response to determining that the fourth detection result is that the second serial clock line signal corresponding to the slave device does not change to the high level within the preset duration, that the time for the slave device to enter the clock stretching state does not exceed the preset duration to obtain the third detection result.

In some implementations, the controlling the master device and/or the slave device according to the third detection result includes:

determining, in response to determining that the third detection result is that the time for the slave device to enter the clock stretching state exceeds the preset duration, that the slave device is in an abnormal state; and outputting, based on the third integrated circuit bus between the complex programmable logic device and the master device, high impedance to the master device, and pulling up the first serial clock line signal corresponding to the master device.

In some implementations, the method further includes:

waiting for the slave device to exit the clock stretching state when it is determined, in response to determining that the third detection result is that the time for the slave device to enter the clock stretching state does not exceed the preset duration, that the slave device is in a normal state.

In some implementations, the method further includes:

pulling up, in response to determining that the first detection result is that the slave device does not enter the clock stretching state or has already exited the clock stretching state, the second serial clock line signal corresponding to the slave device, and recording the acknowledge character signal returned by the slave device to the master device to an acknowledge character register corresponding to the slave device;

controlling the master device to exit the waiting state; and returning and outputting, based on the second integrated circuit bus between the complex programmable logic device and the master device, the acknowledge character signal to the master device as an acknowledge character bit.

In some implementations, the controlling the master device to exit the waiting state includes:

pulling up a first serial clock line signal corresponding to the master device, and releasing a clock stretching state corresponding to the master device.

In some implementations, after the returning and outputting, based on the second integrated circuit bus between the complex programmable logic device and the master device, the acknowledge character signal to the master device as an acknowledge character bit, the method further includes:

identifying the acknowledge character signal;

determining, according to an identification result, a characterization state corresponding to the acknowledge character signal, where the characterization state includes a response state and a non-response state; and processing the first integrated circuit bus between the master device and the slave device according to the characterization state corresponding to the acknowledge character signal.

In some implementations, the processing the first integrated circuit bus between the master device and the slave device according to the characterization state corresponding to the acknowledge character signal includes:

exiting takeover of the first integrated circuit bus between the master device and the slave device in response to that the characterization state corresponding to the acknowledge character signal is the non-response state, and ending an interaction between the master device and the slave device based on the first integrated circuit bus, where the non-response state is configured to characterize that the slave device does not process the target data sent by the master device.

In some implementations, the method further includes:

obtaining, in response to that the characterization state corresponding to the acknowledge character signal is the response state, a highest bit of a next byte sent by the master device to the slave device, and recording the highest bit of the next byte to a serial data line register, where the response state is configured to characterize that the slave device processes the target data sent by the master device;

sending the highest bit of the next byte to the slave device;

re-detecting whether the slave device enters the clock stretching state; and returning to the transparent transmission mode until communication between the master device and the slave device is ended.

According to a second aspect, the present application provides an apparatus for processing clock stretching in a transparent transmission mode of an integrated circuit bus, which is applied to a complex programmable logic device. The apparatus includes:

an obtaining module, configured to obtain target data transmitted by a master device to a slave device based on a first integrated circuit bus;

a detecting module, configured detect, according to the target data, whether the master device has already completed sending a byte of data to the slave device;

a confirming module, configured to confirm, in response to determining that the master device has already completed sending the byte of data to the slave device, that the master device is about to send an acknowledge character bit to the slave device; and a takeover module, configured to take over the first integrated circuit bus between the master device and the slave device, disable a transparent transmission mode between the master device and the slave device, and control the master device and/or the slave device.

According to a third aspect, the present application provides an electronic device, including a complex programmable logic device, configured to perform a method for processing clock stretching in a transparent transmission mode of an integrated circuit bus according to the foregoing first aspect or any implementation corresponding to the foregoing first aspect.

According to a fourth aspect, the present application provides a computer-readable storage medium. The program computer-readable storage medium has computer instructions stored therein, where the computer instructions are configured to enable a computer to perform the method for processing clock stretching in a transparent transmission mode of an integrated circuit bus according to the foregoing first aspect or any implementation corresponding to the foregoing first aspect.

BRIEF DESCRIPTION OF THE DRAWINGS

To describe technical solutions in implementations of the present application or in a related art more clearly, the following briefly describes accompanying drawings for describing the implementations or the related art. Apparently, the accompanying drawings in the following description show some implementations of the present application, and a person of ordinary skill in the art may still obtain other accompanying drawings from the accompanying drawings without creative efforts.

DETAILED DESCRIPTION

To make objectives, technical solutions, and advantages of embodiments of the present application clearer, the following clearly and completely describes the technical solutions in the embodiments of the present application with reference to the accompanying drawings in the embodiments of the present application. Apparently, the described embodiments are part rather than all of the embodiments of the present application. Based on the embodiments in the present application, other embodiments obtained by those skilled in the art without creative work fall within the scope of protection of the present application.

In a server machine, an integrated circuit bus signal is usually used for a BMC on a board to access devices, such as a temperature sensor, a fan controller, a backplane, and a PCIe expansion card. The BMC manages a foregoing device in a polling manner. The BMS serves as a master device of the integrated circuit bus signal, and another device services as a slave device. When the slave device is in a busy state and may not immediately respond to an access of an integrated circuit bus of the BMC, a serial data line signal of the integrated circuit bus will be actively pulled down to pause polling of the integrated circuit bus. After the slave device exits the busy state, the serial data line signal is released to response the access of the integrated circuit bus again. This process is clock stretching of the integrated circuit bus.

The clock stretching of the integrated circuit bus is divided into a byte level and a bit level. The byte level is a process that the slave device pulls down the serial data line signal after receiving complete byte data or a command, which is configured to process received data internally from the slave device. The bit level is mainly used for a case in which a serial data line signal rate of the integrated circuit bus supported by the slave device is lower than a serial data line signal rate sent by the master device, and the slave device pulls down the serial data line signal to reduce an actual serial data line signal rate.

In an actual hardware design, rates that slave devices may support are comprehensively considered when the serial data line signal rate of the master device is selected, so bit-level clock stretching may not occur. Common is byte-level clock stretching.

Figure 1:
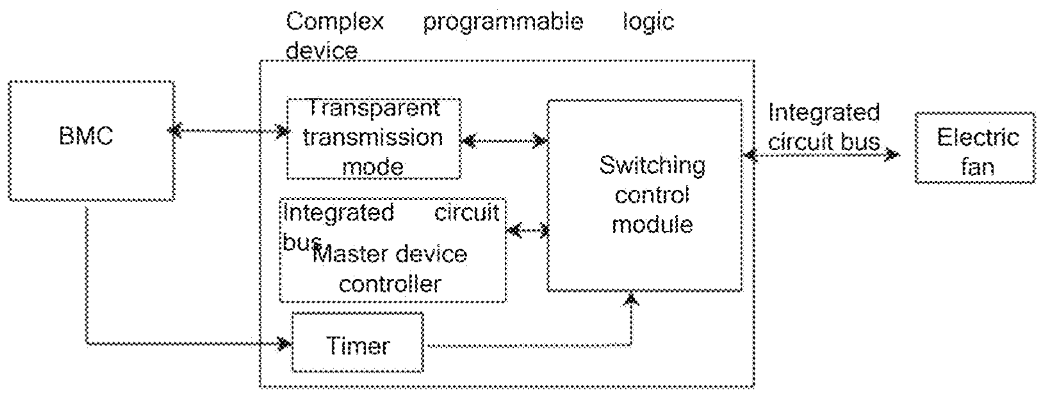
FIG. 1 is a schematic flowchart of transparent transmission control of an integrated control bus signal in a related art according to embodiments of the present application.

For example, as shown in FIG. 1, for a scenario in which a BMC access a fan controller through an integrated circuit bus, to prevent fan control failure after an abnormal case occurs in the BMC, the integrated circuit bus of the BMC is usually connected to a complex programmable logic device in hardware, and then the integrated circuit bus is transparently transmitted to the fan controller by the complex programmable logic device. After it is detected that the BMC hangs, the complex programmable logic device will actively take over the integrated circuit bus of the fan controller to control a fan.

In a related solution in which a complex programmable logic device takes over an integrated circuit bus, real-time bidirectional transparent transmission of an integrated circuit bus at a BMC end and an integrated circuit bus at a FAN_IC end may not be implemented because the complex programmable logic device is a digital logic device. Therefore, a low-level priority manner is used, as shown in the following table.

TABLE 1

| Determination of integrated circuit bus signal in transparent transmission mode | | |
|---|---|---|
| Master device signal | Slave device signal | Signal transmission direction |
| Low | High | From master device to slave device |
| High | Low | From slave device to master device |
| Low | Low | Hold |
| High | High | High-Z |

Figure 2:
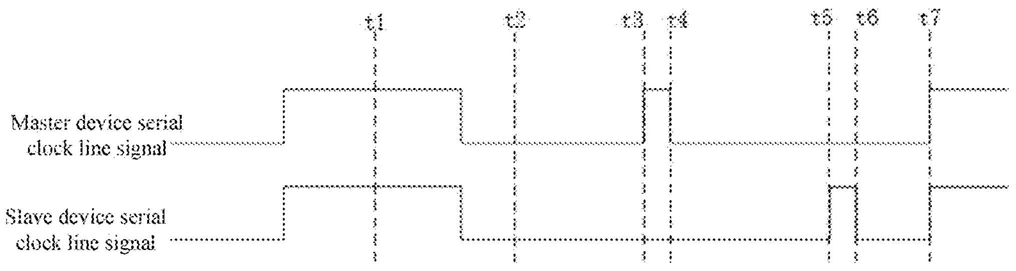
FIG. 2 is a schematic diagram that short pulses appear on a serial clock line signal when a slave device is in clock stretching according to embodiments of the present application.

In a related art, when a slave device triggers clock stretching, a short pulse will appear on an integrated circuit bus. For example, as shown in FIG. 2, after the slave device receives a last bit of a byte of data at t1, the slave device triggers the clock stretching at t2 and pulls down a serial clock line signal corresponding to the slave device. However, in this case, both the serial clock line signal of the slave device and a serial clock line signal of the master device are at a low level, so a master device end may not sense that the slave device triggers the clock stretching. In this case, a signal direction determined by the complex programmable logic device is from the master device to the slave device. At a time t3, the master device pulls up the serial clock line signal to generate high level of the serial clock line signal corresponding to an acknowledge character bit. After it is detected that the serial clock line signal at the master device end is pulled up, the complex programmable logic device synchronously pulls up the serial clock line signal corresponding to the slave device. However, because the slave device triggers the clock stretching, the serial clock line signal corresponding to the slave device has already been pulled down, and the complex programmable logic device may not pull up. In this case, the signal direction detected by the complex programmable logic device is from the slave device to the master device. Therefore, at a time t4, low level of the serial clock line signal corresponding to the slave device is transparently transmitted to the serial clock line signal corresponding to the master device, that is, the serial clock line signal corresponding to the master device is pulled down. It may be seen that a short pulse appears on the serial clock line signal corresponding to the master device at time t3 to t4.

Similarly, the slave device exits the clock stretching at a time t5, and a short pulse is generated on the serial clock line signal corresponding to the slave device at time t5 to t6 when the serial clock line signal corresponding to the slave device is pulled up.

In a case that after the slave device receives a byte and generates a corresponding acknowledge character signal, and the clock stretching is generated, that is, the short pulse is an acknowledge character bit at the time t1, and the short pulse is a highest bit of a next byte of data at the time t3. The foregoing two pulses will be generated in processes of triggering and releasing the clock stretching.

The foregoing short pulses do not comply with a definition of the clock stretching in an integrated circuit bus protocol, which will cause errors in the integrated circuit bus and affect normal communication between the master device and the slave device.

Based on the foregoing content, these embodiments of the present application provide embodiments of a method for processing clock stretching in a transparent transmission mode of an integrated circuit bus. It is to be noted that, steps shown in a flowchart of the drawings may be performed in a computer system such as a set of computer-readable instructions, and although the logical order is shown in the flowchart, in some cases, the steps shown or described may be performed in a different order.

It is to be noted that the method for processing clock stretching in a transparent transmission mode of an integrated circuit bus according to these embodiments of the present application may be performed by an apparatus for processing clock stretching in a transparent transmission mode of an integrated circuit bus. The apparatus for processing clock stretching in a transparent transmission mode of an integrated circuit bus may be implemented as part or all of the complex programmable logic device in a manner of software, hardware, or a combination of software and hardware. In the following method embodiments, descriptions are provided by using examples in which the method for processing clock stretching in a transparent transmission mode of an integrated circuit bus is performed by a complex programmable logic device.

Figure 3:
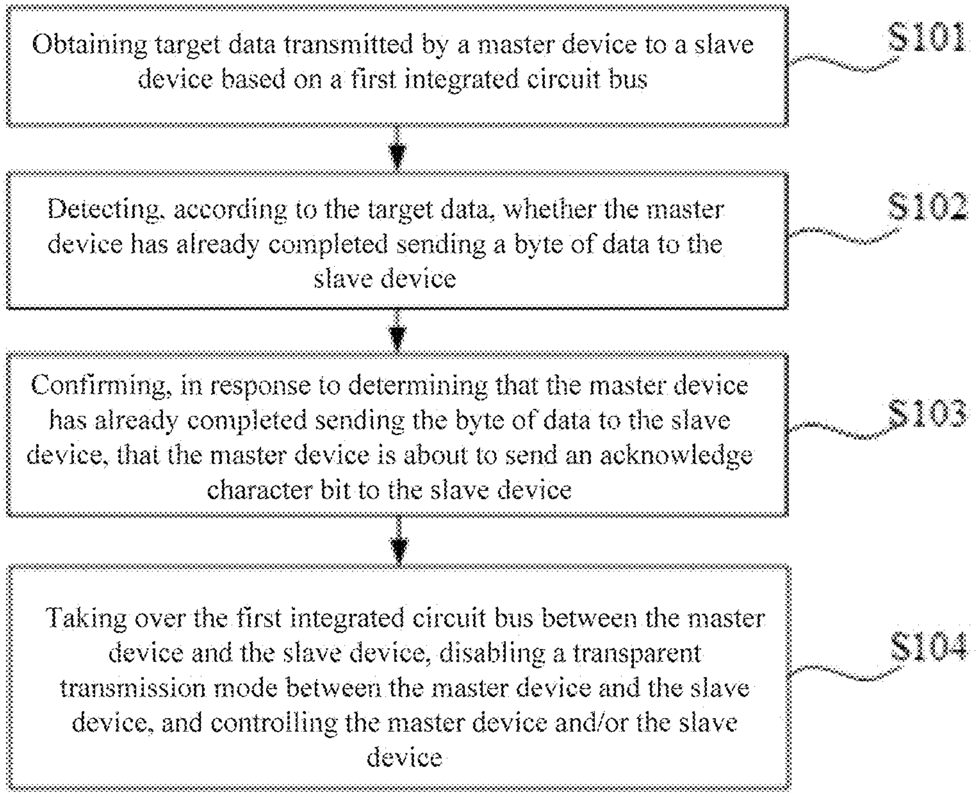
FIG. 3 is a schematic flowchart of a method for processing clock stretching in a transparent transmission mode of an integrated circuit bus according to some embodiments of the present application.

In some embodiments, a method for processing clock stretching in a transparent transmission mode of an integrated circuit bus is provided, which may be applied to the foregoing complex programmable logic device. FIG. 3 is a flowchart of a method for processing clock stretching in a transparent transmission mode of an integrated circuit bus according to embodiments of the present application. As shown in FIG. 3, the flowchart includes the following steps:

Step S101: Obtaining target data transmitted by a master device to a slave device based on a first integrated circuit bus.

In some embodiments, the complex programmable logic device may obtain, based on communication connection between the master device and the slave device, the target data transmitted by the master device to the slave device based on the first integrated circuit bus.

Step S102: Detecting, according to the target data, whether the master device has already completed sending a byte of data to the slave device.

In some embodiments, the complex programmable logic device may identify the target data to determine data volume corresponding to the target data, and detect, according to the data volume corresponding to the target data, whether the master device has already completed sending a byte of data to the slave device.

In some embodiments, a byte of data includes 8 bits, so it is determined, in response to determining that the target data is 8 bits, that the master device has already completed sending a byte of data to the slave device. It is determined, in response to determining that the target data is less than 8 bits, that the master device has not already completed sending a byte of data to the slave device.

When it is determined, in response to determining that the target data is less than 8 bits, that the master device has not already completed sending a byte of data to the slave device, a transparent transmission mode between the master device and the slave device is continued to be enabled, whereby the master device completes sending a byte of data to the slave device.

Step S103: Confirming, in response to determining that the master device has already completed sending the byte of data to the slave device, that the master device is about to send an acknowledge character bit to the slave device.

In some embodiments, in response to determining that the master device has already completed sending the byte of data to the slave device, the master device is about to send an acknowledge character bit to the slave device. Therefore, the complex programmable logic device determines that the master device is about to send the acknowledge character bit to the slave device.

Step S104: Taking over the first integrated circuit bus between the master device and the slave device, disabling a transparent transmission mode between the master device and the slave device, and controlling the master device and/or the slave device.

In some embodiments, the complex programmable logic device takes over the first integrated circuit bus between the master device and the slave device, that is, cuts off the first integrated circuit bus between the master device and the slave device, connects a second integrated circuit bus between the complex programmable logic device and the master device, and connects a third integrated circuit bus between the complex programmable logic device and the slave device.

Then, the complex programmable logic device disables the transparent transmission mode between the master device and the slave device, identifies a state of the slave device based on the third integrated circuit bus between the complex programmable logic device and the slave device, and controls the master device and/or the slave device according to the state of the slave device.

This step will be described in detail hereinafter.

In a method for processing clock stretching in a transparent transmission mode of an integrated circuit bus according to these embodiments of the present application, target data transmitted by a master device to a slave device based on a first integrated circuit bus is obtained, and then, whether the master device has already completed sending a byte of data to the slave device is detected according to the target data. Accuracy of a detected result of whether the master device has already completed sending the byte of data to the slave device is ensured. In response to determining that the master device has already completed sending the byte of data to the slave device, it is confirmed that the master device is about to send an acknowledge character bit to the slave device. Accuracy of a confirmed result that the first integrated circuit bus is about to enter an acknowledge character bit state is ensured. The first integrated circuit bus between the master device and the slave device is taken over, the transmission mode between the master device and the slave device is disabled, and the master device and/or the slave device is controlled, to avoid generating short pulses on a first serial clock line signal corresponding to the master device and a second serial clock line signal corresponding to the slave device after the master device sends the acknowledge character bit to the slave device, thereby avoiding an impact on normal communication between the master device and the slave device. Stability of a first integrated circuit bus interaction is ensured without changing original hardware connection architecture, and continuity and stability of a BMC in a server, that is, a master device management peripheral, are increased.

Figure 4:
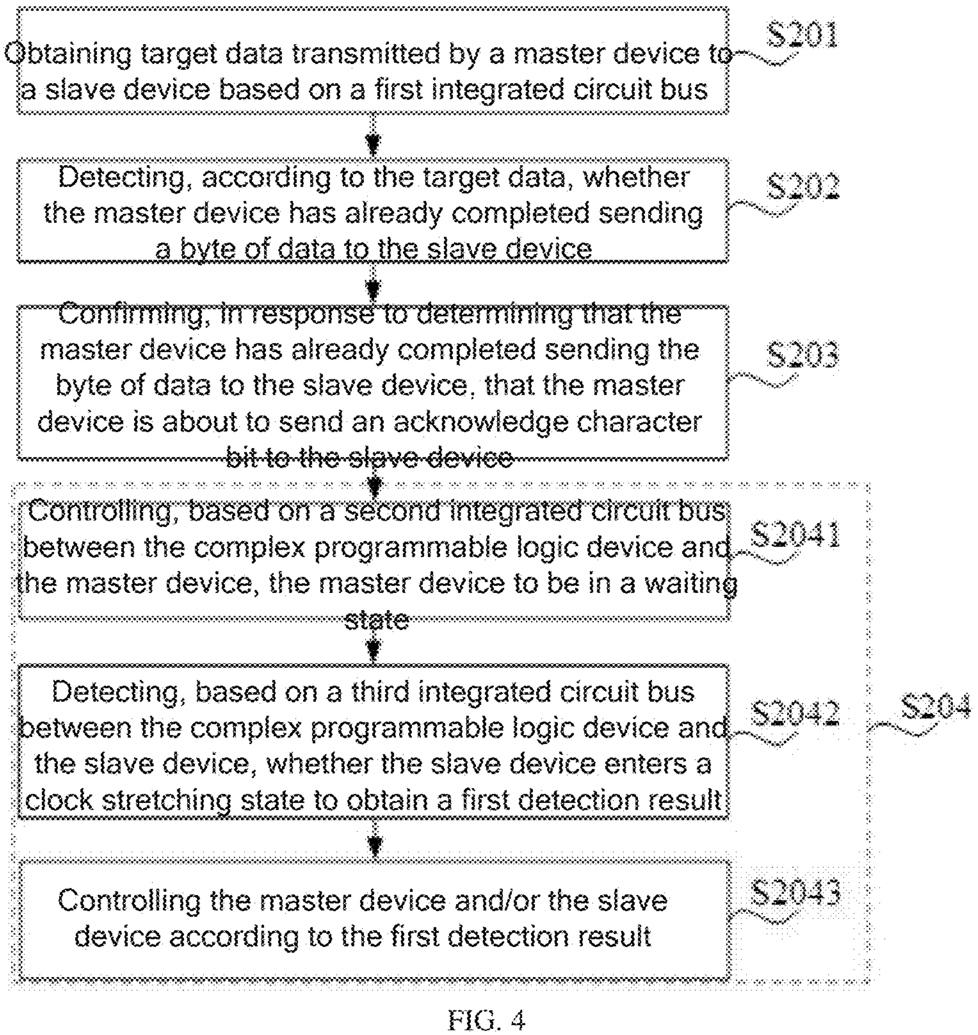
FIG. 4 is a schematic flowchart of another method for processing clock stretching in a transparent transmission mode of an integrated circuit bus according to embodiments of the present application.

In some embodiments, a method for processing clock stretching in a transparent transmission mode of an integrated circuit bus is provided, which may be applied to the foregoing complex programmable logic device. FIG. 4 is a flowchart of a method for processing clock stretching in a transparent transmission mode of an integrated circuit bus according to embodiments of the present application. As shown in FIG. 4, the flowchart includes the following steps:

Step S201: Obtaining target data transmitted by a master device to a slave device based on a first integrated circuit bus.

For this step, refer to descriptions of S101 in FIG. 1. Details are not described herein.

Step S202: Detecting, according to the target data, whether the master device has already completed sending a byte of data to the slave device.

For this step, refer to descriptions of S102 in FIG. 1. Details are not described herein.

Step S203: Confirming, in response to determining that the master device has already completed sending the byte of data to the slave device, that the master device is about to send an acknowledge character bit to the slave device.

For this step, refer to descriptions of S103 in FIG. 1. Details are not described herein.

Step S204: Taking over the first integrated circuit bus between the master device and the slave device, disabling a transparent transmission mode between the master device and the slave device, and controlling the master device and/or the slave device.

In some embodiments, the foregoing step S204 includes:

Step S2041: Controlling, based on a second integrated circuit bus between the complex programmable logic device and the master device, the master device to be in a waiting state.

In some implementations of the present application, the foregoing step S2041 may include following:

controlling, based on the second integrated circuit bus between the complex programmable logic device and the master device, the master device to enter the clock stretching state, and pulling down a first serial clock line signal corresponding to the master device to enable the master device to be in the waiting state.

In some embodiments, the complex programmable logic device triggers clock stretching of the master device based on the second integrated circuit bus between the complex programmable logic device and the master device, to control the master device to enter the clock stretching state, and pull down the first serial clock line signal corresponding to the master device to enable the master device to be in the waiting state.

It is to be noted that, the master device is controlled, based on the second integrated circuit bus between the complex programmable logic device and the master device, to enter the clock stretching state, and the first serial clock line signal corresponding to the master device is pulled down to enable the master device to be in the waiting state. An acknowledge character bit state is prevented from being sending by the slave device to the master device, whereby the first serial clock line signal corresponding to the master device is prevented from generating a pulse to affect normal communication between the master device and the slave device.

Step S2042: Detecting, based on a third integrated circuit bus between the complex programmable logic device and the slave device, whether the slave device enters a clock stretching state to obtain a first detection result.

It is to be noted that, whether the slave device enters the clock stretching state is detected based on the third integrated circuit bus between the complex programmable logic device and the slave device to obtain the first detection result, which ensures the accuracy of the obtained first detection result.

In some implementations of the present application, the foregoing step S2042 may include following:

Step a1: Continuously pulling up a second serial clock line signal corresponding to the slave device, and sending a third serial clock line signal corresponding to the acknowledge character bit to the slave device.

In some embodiments, the complex programmable logic device may continuously pull up the second serial clock line signal corresponding to the slave device, and send the third serial clock line signal corresponding to the acknowledge character bit to the slave device.

Step a2: Detecting whether the second serial clock line signal corresponding to the slave device is at a high level to obtain a second detection result.

In some embodiments, the complex programmable logic device continuously detects, during continuously pulling up the second serial clock line signal corresponding to the slave device, and sending the third serial clock line signal corresponding to the acknowledge character bit to the slave device, whether the second serial clock line signal corresponding to the slave device is at the high level to obtain the second detection result.

Step a3: Determining, according to the second detection result, whether the slave device enters the clock stretching state to obtain the first detection result.

It is to be noted that, the second serial clock line signal corresponding to the slave device is continuously pulled up, and the third serial clock line signal corresponding to the acknowledge character bit is sent to the slave device. Whether the second serial clock line signal corresponding to the slave device is at the high level is detected to obtain the second detection result, which ensures accuracy of the obtained second detection result. Then, whether the slave device enters the clock stretching state is determined according to the second detection result to obtain the first detection result, which ensures accuracy of a determined result of whether the slave device enters the clock stretching state. Therefore, accuracy of controlling the master device and/or the slave device may be ensured according to whether the slave device enters the clock stretching state. An impact on normal communication between the master device and the slave device may be avoided. Stability of a first integrated circuit bus interaction is ensured without changing original hardware connection architecture, and continuity and stability of a BMC in a server, that is, a master device management peripheral, are increased.

In some implementations of the present application, the foregoing step a3 may include following cases:

in one case, in response to determining that the second detection result is that the second serial clock line signal corresponding to the slave device is at the high level, it is determined that the slave device does not enter the clock stretching state or the slave device has already exited the clock stretching state to obtain the first detection result.

It is to be noted that, in response to determining that the second detection result is that the second serial clock line signal corresponding to the slave device is at the high level, it is determined that the slave device does not enter the clock stretching state or the slave device has already exited the clock stretching state to obtain the first detection result, which ensures accuracy of a determined result that the slave device does not enter the clock stretching state or the slave device has already exited the clock stretching state.

In some embodiments, in response to determining that the second detection result is that the second serial clock line signal corresponding to the slave device is at the high level, the complex programmable logic device determines that the slave device does not enter the clock stretching state or the slave device has already exited the clock stretching state to obtain the first detection result.

In another case, in response to determining that the second detection result is that the second serial clock line signal corresponding to the slave device is at a low level, it is determined that the slave device enters the clock stretching state to obtain the first detection result.

In some embodiments, in response to determining that the second detection result is that the second serial clock line signal corresponding to the slave device is at the low level, it is determined that the slave device enters the clock stretching state to obtain the first detection result, which ensures accuracy of determining that the slave device enters the clock stretching state.

Step S2043: Controlling the master device and/or the slave device according to the first detection result.

The slave device and/the master device is controlled according to the first detection result, which ensures accuracy of controlling the master device and/or the slave device, and avoids generating a pulse on the second serial clock line signal corresponding to the slave device, thereby avoiding an impact on normal communication between the master device and the slave device. Without changing original hardware connection architecture, stability of a first integrated circuit bus interaction is ensured, and continuity and stability of a BMC in a server, that is, a master device management peripheral, are increased.

In some implementations of the present application, the foregoing step S2043 may include following:

Step b1: Starting a timeout timer in response to determining that the first detection result is that the slave device enters the clock stretching state.

The timeout timer is preset with a preset duration. The preset duration may be 0.1 second, 0.2 second, or another duration. The preset duration is not limited in these embodiments of the present application.

Step b2: Detecting, based on the timeout timer, whether a time for the slave device to enter the clock stretching state exceeds the preset duration to obtain a third detection result.

In some implementations of the present application, the complex programmable logic device may continuously detect whether the second serial clock line signal corresponding to the slave device is at the high level, and record a time when the second serial clock line signal corresponding to the slave device changes to the high level. Duration for the slave device to enter the clock stretching state is determined according to the time when the second serial clock line signal corresponding to the slave device changes to the high level.

The duration is compared with the preset duration. Whether the duration for the slave device to enter the clock stretching state exceeds the preset duration is determined according to a comparison result. In response to determining that duration is greater than the preset duration, it is determined that the duration for the slave device to enter the clock stretching state exceeds the preset duration to obtain the third detection result. In response to determining that the duration is less than the preset duration, it is determined that the duration for the slave device to enter the clock stretching state does not exceed the preset duration to obtain the third detection result.

It is to be noted that, the timeout timer is started in response to determining that the first detection result is that the slave device enters the clock stretching state, and whether the time for the slave device to enter the clock stretching state exceeds the preset duration is detected to obtain the third detection result, which ensures accuracy of the obtained third detection result. The slave device and/the master device is controlled according to the third detection result, which ensures accuracy of controlling the master device and/or the slave device, thereby avoiding an impact on normal communication between the master device and the slave device. Without changing original hardware connection architecture, stability of a first integrated circuit bus interaction is ensured, and continuity and stability of a BMC in a server, that is, a master device management peripheral, are increased.

In some implementations of the present application, the foregoing step b2 may include following:

Step b21: Continuously detecting whether a second serial clock line signal corresponding to a slave device changes to a high level within a preset duration to obtain a fourth detection result.

In some embodiments, the complex programmable logic device may continuously detect whether the second serial clock line signal corresponding to the slave device changes to the high level within the preset duration to obtain the fourth detection result.

For example, assuming that the preset duration is 0.1 second, the complex programmable logic device continuously detects whether the second serial clock line signal corresponding to the slave device changes to the high level within the 0.1 second to obtain the fourth detection result.

Step b22: Determining, according to the fourth detection result, whether the time for the slave device to enter the clock stretching state exceeds the preset duration to obtain the third detection result.

It is to be noted that whether the second serial clock line signal corresponding to the slave device changes to the high level within the preset duration is detected to obtain the fourth detection result, which ensures accuracy of the obtained fourth detection result. Whether the time for the slave device to enter the clock stretching state is determined according to the fourth detection result to obtain the third detection result, which ensures accuracy of determining, according to the fourth detection result, whether the time for the slave device to enter the clock state exceeds the preset duration to obtain the third detection result.

In some implementations of the present application, the foregoing step b22 may include following cases:

in one case, in response to determining that the fourth detection result is that the second serial clock line signal corresponding to the slave device changes to the high level within the preset duration, it is determined that the time for the slave device to enter the clock stretching state does not exceed the preset duration to obtain the third detection result.

For example, in response to determining that the fourth detection result is that the second serial clock line signal corresponding to the slave device changes to the high level within 0.1 second, the complex programmable logic device determines that the time for the slave device to enter the clock stretching state does not exceed the preset duration to obtain the third detection result.

It is to be noted that, in response to determining that the fourth detection result is that the second serial clock line signal corresponding to the slave device changes to the high level within the preset duration, it is determined that the time for the slave device to enter the clock stretching state does not exceed the preset duration to obtain the third detection result, which ensures accuracy of the determined result that the time for the slave device to enter the clock stretching state does not exceed the preset duration.

In another case, in response to determining that the fourth detection result is that the second serial clock line signal corresponding to the slave device does not change to the high not level within the preset duration, it is determined that the time for the slave device to enter the clock stretching state exceeds the preset duration to obtain the third detection result.

For example, in response to determining that the fourth detection result is that the second serial clock line signal corresponding to the slave device does not change to the high not level within 0.1 second, the complex programmable logic device determines that the time for the slave device to enter the clock stretching state exceeds the preset duration to obtain the third detection result.

It is to be noted that, in response to determining that the fourth detection result is that the second serial clock line signal corresponding to the slave device does not change to the high level within the preset duration, it is determined that the time for the slave device to enter the clock stretching state exceeds the preset duration to obtain the third detection result, which ensures accuracy of the determined result that the time for the slave device to enter the clock stretching state exceeds the preset duration.

Step b3: Controlling the master device and/or the slave device according to the third detection result.

In some implementations of the present application, the foregoing step b3 may include following cases:

In one case, in response to determining that the third detection result is that the time for the slave device to enter the clock stretching state exceeds the preset duration, it is determined that the slave device is in an abnormal state.

High impedance is output to the master device based on the third integrated circuit bus between the complex programmable logic device and the master device, and a first serial clock line signal corresponding to the master device is pulled up.

In some embodiments, in response to determining that the third detection result is that the time for the slave device to enter the clock stretching state exceeds the preset duration, it is determined that the slave device is in an abnormal state. The complex programmable logic device outputs high impedance to the master device based on the third integrated circuit bus between the complex programmable logic device and the master device, and pulls up the first serial clock line signal corresponding to the master device, whereby disabling the transparent transmission mode between the master device and the slave device.

It is to be noted that, in response to determining that the third detection result is that the time for the slave device to enter the clock stretching state exceeds the preset duration, it is determined that the slave device is in the abnormal state, the high impedance is output to the master device based on the third integrated circuit bus between the complex programmable logic device and the master device, and the first serial clock line signal corresponding to the master device is pulled up, whereby disabling the transparent transmission mode between the master device and the slave device, and preventing the slave device in the abnormal state from affecting another device on the integrated circuit bus.

In another case, when it is determined, in response to determining that the third detection result is that the time for the slave device to enter the clock stretching state does not exceed the preset duration, that the slave device is in a normal state, the slave device is waited to exit the clock stretching state.

In some embodiments, when is it determined, in response to determining that the third detection result is that the time for the slave device to enter the clock stretching state does not exceed the preset duration, that the slave device is in a normal state, the slave device is waited to exit the clock stretching state.

It is to be noted that, when it is determined, in response to determining that the third detection result is that the time for the slave device to enter the clock stretching state does not exceed the preset duration, that the slave device is in a normal state, the slave device is waited to exit the clock stretching state, whereby normal communication between the master device and the slave device may be ensured.

Step b4: Pulling up, in response to determining that the first detection result is that the slave device does not enter the clock stretching state or has already exited the clock stretching state, the second serial clock line signal corresponding to the slave device, and recording the acknowledge character signal returned by the slave device to the master device to an acknowledge character register corresponding to the slave device.

In some embodiments, in response to determining that the first detection result is that the slave device does not enter the clock stretching state or has already exited the clock stretching state, the complex programmable logic device pulls up the second serial clock line signal corresponding to the slave device, obtains an acknowledge character signal returned by the slave device to the master device, and records the acknowledge character signal returned by the slave device to the master device to an acknowledge character register corresponding to the slave device.

Step b5: Controlling the master device to exit a waiting state.

In some implementations of the present application, the foregoing step b5 may include following:

- pulling up a first serial clock line signal corresponding to the master device, and releasing a clock stretching state corresponding to the master device.

In some embodiments, the complex programmable logic device pulls up the first serial clock line signal corresponding to the master device, and releases the clock stretching state corresponding to the master device, whereby the master device may communicate normally.

It is to be noted that, the first serial clock line signal corresponding to the master device is pulled up, and the clock stretching state corresponding to the master device is released, whereby the master device exits the waiting state.

Step b6: Returning and outputting, based on the second integrated circuit bus between the complex programmable logic device and the master device, the acknowledge character signal to the master device as an acknowledge character bit.

In some embodiments, the complex programmable logic device returns and outputs, based on the second integrated circuit bus between the complex programmable logic device and the master device, the obtained acknowledge character signal returned from the slave device to the master device to the master device as an acknowledge character bit.

It is to be noted that, in response to determining that the first detection result is that the slave device does not enter the clock stretching state or has already exited the clock stretching state, the second serial clock line signal corresponding to the slave device is pulled up, whereby the master device may return the acknowledge character signal to the master device. The acknowledge character signal returned by the slave device to the master device is recorded to the acknowledge character register corresponding to the slave device, whereby the acknowledge character signal returned by the slave device to the master device may be obtained. The master device is controlled to exit the waiting state to enable the master device to be in a normal communication state. Based on the second integrated circuit bus between the complex programmable logic device and the master device, the acknowledge character signal is returned to the master device as the acknowledge character bit, whereby the master device may receive the acknowledge character signal returned by the slave device, and then a next step of communication between the master device and the slave device may be ensured.

Step b7: Identifying the acknowledge character signal.

In some embodiments, the complex programmable logic device may identify the acknowledge character signal.

Step b8, determining, according to an identification result, a characterization state corresponding to the acknowledge character signal.

The characterization state includes a response state and a non-response state. In some embodiments, the complex programmable logic device may determine, according to the identification result, the characterization state corresponding to the acknowledge character signal.

Step b9: Processing the first integrated circuit bus between the master device and the slave device according to the characterization state corresponding to the acknowledge character signal.

It is to be noted that, the acknowledge character signal is identified; and the characterization state corresponding to the acknowledge character signal is determined according to the identification result, which ensures accuracy of the determined characterization state corresponding to the acknowledge character signal. The first integrated circuit bus between the master device and the slave device is processed according to the characterization state corresponding to the acknowledge character signal, which ensures accuracy of processing the first integrated circuit bus between the master device and the slave device.

In some implementations of the present application, the foregoing step b9 may include following cases:

- in one case, in response to determining that the characterization state corresponding to the acknowledge character signal is a non-response state, exiting takeover of the first integrated circuit bus between the master device and the slave device, and ending an interaction between the master device and the slave device based on the first integrated circuit bus.

The non-response state is configured to characterize that the slave device does not process the target data sent by the master device.

In some embodiments, in response to determining that the characterization state corresponding to the acknowledge character signal is the non-response state, the complex programmable logic device exits the takeover of the first integrated circuit bus between the master device and the slave device, and an interaction between the master device and the slave device based on the first integrated circuit bus is ended.

It is to be noted that, in response to determining that the characterization state corresponding to the acknowledge character signal is a non-response state, the takeover of the first integrated circuit bus between the master device and the slave device is exited, and the interaction between the master device and the slave device based on the first integrated circuit bus is ended. In a process that the complex programmable logic device takes over the first integrated circuit bus between the master device and the slave device, a short pulse is not generated on the first serial clock line signal corresponding to the master device and the second serial clock line signal corresponding to the slave device, which ensures normal communication between the master device and the slave device. Without changing original hardware connection architecture, stability of a first integrated circuit bus interaction is ensured, and continuity and stability of a BMC in a server, that is, a master device management peripheral, are increased.

In another case, in response to that the characterization state corresponding to the acknowledge character signal is the response state, a highest bit of a next byte sent by the master device to the slave device is obtained, and the highest bit of the next byte is recorded to a serial data line register, where the response state is configured to characterize that the slave device processes the target data sent by the master device, sending the highest bit of the next byte to the slave device, re-detecting whether the slave device enters the clock stretching state, and returning to a transparent transmission mode until the communication between the master device and the master device is ended.

In some embodiments, in response to that the characterization state corresponding to the acknowledge character signal is the response state, the complex programmable logic device obtains the highest bit of the next byte sent by the master device to the slave device, and records the highest bit of the next byte to the serial data line register. The complex programmable logic device sends the highest bit of the next byte to the slave device, to achieve normal communication between the master device and the slave device.

The complex programmable logic device re-detects whether the slave device enters the clock stretching state. For a detecting process, refer to the foregoing implementation. In response to that the slave device enters the clock stretching state, the complex programmable logic device actively controls the master device to enter the clock stretching state, and pulls down the first serial clock line signal corresponding to the master device to enable the master device to be in a waiting state. Meanwhile, the timeout timer is started, and whether the slave device is in an abnormal state is determined. For steps, refer to the foregoing implementation. In response to that the slave device does not enter the clock stretching state or has already exited the clock stretching state, the complex programmable logic device pulls up the second serial clock line signal corresponding to the slave device, sends the highest bit of the next byte to the slave device, repeats this cycle, and returns to the transparent transmission mode until the communication between the master device and the slave device is ended.

It is to be noted that, in response to that the characterization state corresponding to the acknowledge character signal is the response state, the highest bit of the next byte sent by the master device to the slave device is obtained, and the highest bit of the next byte is recorded to the serial data line register, whereby the highest bit of the next byte may be obtained. Then, the highest bit of the next byte is sent to the slave device, which ensures normal communication between the master device and the slave device. Whether the slave device enters the clock stretching state is re-detected, and the transparent transmission mode is returned until the communication between the master device and the slave device is ended. In a process that the complex programmable logic device takes over the first integrated circuit bus between the master device and the slave device, a short pulse is not generated on the first serial clock line signal corresponding to the master device and the second serial clock line signal corresponding to the slave device, which ensures the normal communication between the master device and the slave device. Without changing original hardware connection architecture, stability of a first integrated circuit bus interaction is ensured, and continuity and stability of a BMC in a server, that is, a master device management peripheral, are increased.

In the method for processing clock stretching in a transparent transmission mode of an integrated circuit bus according to these embodiments of the present application, the master device is controlled to enter the clock stretching state based on the second integrated circuit bus between the complex programmable logic device and the master device, and the first serial clock line signal corresponding to the master device is pulled down to enable the master device to be in the waiting state. An acknowledge character bit state is prevented from being sending by the slave device to the master device, whereby the first serial clock line signal corresponding to the master device is prevented from generating a pulse to affect normal communication between the master device and the slave device.

Then, the second serial clock line signal corresponding to the slave device is continuously pulled up, and a third serial clock line signal corresponding to the acknowledge character bit is sent to the slave device. Whether the second serial clock line signal corresponding to the slave device is at the high level is detected to obtain the second detection result, which ensures accuracy of the obtained second detection result. In response to determining that the second detection result is that the second serial clock line signal corresponding to the slave device is at the high level, it is determined that the slave device does not enter the clock stretching state or the slave device has already exited the clock stretching state to obtain the first detection result, which ensures accuracy of a determined result that the slave device does not enter the clock stretching state or the slave device has already exited the clock stretching state. In response to determining that the second detection result is that the second serial clock line signal corresponding to the slave device is at the low level, it is determined that the slave device enters the clock stretching state to obtain the first detection result, which ensures accuracy of determining that the slave device enters the clock stretching state.

A timeout timer is started in response to determining that the first detection result is that the slave device enters the clock stretching state. Whether the second serial clock line signal corresponding to the slave device changes to the high level within the preset duration is detected to obtain the fourth detection result, which ensures accuracy of the obtained fourth detection result. In response to determining that the fourth detection result is that the second serial clock line signal corresponding to the slave device changes to the high level within the preset duration, it is determined that the time for the slave device to enter the clock stretching state does not exceed the preset duration to obtain the third detection result, which ensures accuracy of the determined result that the time for the slave device to enter the clock stretching state does not exceed the preset duration. In response to determining that the fourth detection result is that the second serial clock line signal corresponding to the slave device does not change to the high level within the preset duration, it is determined that the time for the slave device to enter the clock stretching state exceeds the preset duration to obtain the third detection result, which ensures accuracy of the determined result that the time for the slave device to enter the clock stretching state exceeds the preset duration.

In response to determining that the third detection result is that the time for the slave device to enter the clock stretching state exceeds to the preset duration, it is determined that the slave device is in the abnormal state, the high impedance is output to the master device based on the third integrated circuit bus between the complex programmable logic device and the master device, and the first serial clock line signal corresponding to the master device is pulled up, whereby disabling the transparent transmission mode between the master device and the slave device, and preventing the slave device in the abnormal state from affecting another device on the integrated circuit bus.

When it is determined, in response to determining that the third detection result is that the time for the slave device to enter the clock stretching state does not exceed the preset duration, that the slave device is in a normal state, the slave device is waited to exit the clock stretching state, whereby normal communication between the master device and the slave device may be ensured.

In response to determining that the first detection result is that the slave device does not enter the clock stretching state or has already exited the clock stretching state, the second serial clock line signal corresponding to the slave device is pulled up, whereby the master device may return the acknowledge character signal to the master device. The acknowledge character signal returned by the slave device to the master device is recorded to the acknowledge character register corresponding to the slave device, whereby the acknowledge character signal returned by the slave device to the master device may be obtained. The first serial clock line signal corresponding to the master device is pulled up and the clock stretching state corresponding to the master device is released, whereby the master device exits the waiting state, and the master device is in a normal communication state. Based on the second integrated circuit bus between the complex programmable logic device and the master device, the acknowledge character signal is returned to the master device as the acknowledge character bit, whereby the master device may receive the acknowledge character signal returned by the slave device, and then a next step of communication between the master device and the slave device may be ensured.

The acknowledge character signal is identified; and the characterization state corresponding to the acknowledge character signal is determined according to the identification result, which ensures accuracy of the determined characterization state corresponding to the acknowledge character signal. In response to determining that the characterization state corresponding to the acknowledge character signal is a non-response state, the takeover of the first integrated circuit bus between the master device and the slave device is exited, and the interaction between the master device and the slave device based on the first integrated circuit bus is ended. In a process that the complex programmable logic device takes over the first integrated circuit bus between the master device and the slave device, a short pulse is not generated on the first serial clock line signal corresponding to the master device and the second serial clock line signal corresponding to the slave device, which ensures normal communication between the master device and the slave device. Stability of a first integrated circuit bus interaction is ensured without changing original hardware connection architecture, and continuity and stability of a BMC in a server, that is, a master device management peripheral, are increased. In response to that the characterization state corresponding to the acknowledge character signal is the response state, the highest bit of the next byte sent by the master device to the slave device is obtained, and the highest bit of the next byte is recorded to the serial data line register, whereby the highest bit of the next byte may be obtained. Then, the highest bit of the next byte is sent to the slave device, which ensures normal communication between the master device and the slave device. Whether the slave device enters the clock stretching state is re-detected, and the transparent transmission mode is returned until the communication between the master device and the slave device is ended. In a process that the complex programmable logic device takes over the first integrated circuit bus between the master device and the slave device, a short pulse is not generated on the first serial clock line signal corresponding to the master device and the second serial clock line signal corresponding to the slave device, which ensures the normal communication between the master device and the slave device. Stability of a first integrated circuit bus interaction is ensured without changing original hardware connection architecture, and continuity and stability of a BMC in a server, that is, a master device management peripheral, are increased.

Figure 5:
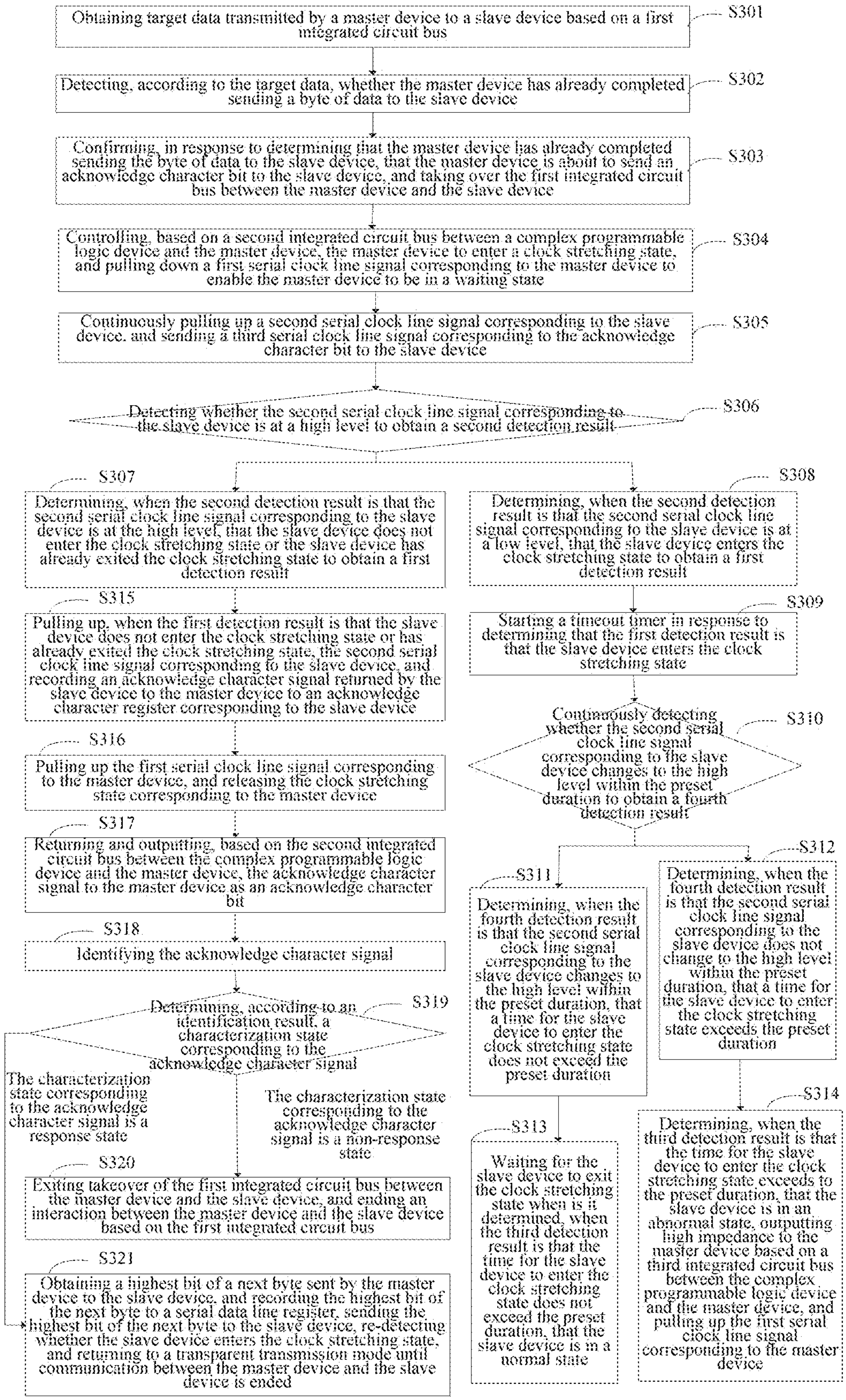
FIG. 5 is a schematic flowchart of still another method for processing clock stretching in a transparent transmission mode of an integrated circuit bus according to embodiments of the present application.

To better implement a method for processing clock stretching in a transparent transmission mode of an integrated circuit bus according to these embodiments of the present application, these embodiments of the present application provides a flowchart of a method for processing clock stretching in a transparent transmission mode of an integrated circuit bus, which may be applied to the foregoing complex programmable logic device. As shown in FIG. 5, the flowchart includes the following steps:

Step 301: Obtaining target data transmitted by a master device to a slave device based on a first integrated circuit bus.

Step 302: Detecting, according to the target data, whether the master device has already completed sending a byte of data to the slave device.

Step 303: Confirming, in response to determining that the master device has already completed sending the byte of data to the slave device, that the master device is about to send an acknowledge character bit to the slave device, and taking over the first integrated circuit bus between the master device and the slave device.

Step 304: Controlling, based on a second integrated circuit bus between a complex programmable logic device and the master device, the master device to enter a clock stretching state, and pulling down a first serial clock line signal corresponding to the master device to enable the master device to be in a waiting state.

Step 305: Continuously pulling up a second serial clock line signal corresponding to the slave device, and sending a third serial clock line signal corresponding to the acknowledge character bit to the slave device.

Step 306: Detecting whether the second serial clock line signal corresponding to the slave device is at a high level to obtain a second detection result.

Step 307: Determining, in response to determining that the second detection result is that the second serial clock line signal corresponding to the slave device is at the high level, that the slave device does not enter the clock stretching state or the slave device has already exited the clock stretching state to obtain a first detection result, and performing step 315.

Step 308: Determining, in response to determining that the second detection result is that the second serial clock line signal corresponding to the slave device is at a low level, that the slave device enters the clock stretching state to obtain a first detection result, and performing step 309.

Step 309: Starting a timeout timer in response to determining that the first detection result is that the slave device enters the clock stretching state.

Step 310: Continuously detecting whether the second serial clock line signal corresponding to the slave device changes to the high level within the preset duration to obtain a fourth detection result.

Step 311: Determining, in response to determining that the fourth detection result is that the second serial clock line signal corresponding to the slave device changes to the high level within the preset duration, that a time for the slave device to enter the clock stretching state does not exceed the preset duration, and performing step 313.

Step 312: Determining, in response to determining that the fourth detection result is that the second serial clock line signal corresponding to the slave device does not change to the high level within the preset duration, that a time for the slave device to enter the clock stretching state exceeds the preset duration, and performing step 314.

Step 313: Waiting for the slave device to exit the clock stretching state when is it determined, in response to determining that the third detection result is that the time for the slave device to enter the clock stretching state does not exceed the preset duration, that the slave device is in a normal state.

Step 314: Determining, in response to determining that the third detection result is that the time for the slave device to enter the clock stretching state exceeds to the preset duration, that the slave device is in an abnormal state, outputting high impedance to the master device based on a third integrated circuit bus between the complex programmable logic device and the master device, and pulling up the first serial clock line signal corresponding to the master device.

Step 315: Pulling up, in response to determining that the first detection result is that the slave device does not enter the clock stretching state or has already exited the clock stretching state, the second serial clock line signal corresponding to the slave device, and recording an acknowledge character signal returned by the slave device to the master device to an acknowledge character register corresponding to the slave device.

Step 316: Pulling up the first serial clock line signal corresponding to the master device, and releasing the clock stretching state corresponding to the master device.

Step 317: Returning and outputting, based on the second integrated circuit bus between the complex programmable logic device and the master device, the acknowledge character signal to the master device as an acknowledge character bit.

Step 318: Identifying the acknowledge character signal.

Step 319: Determining, according to an identification result, a characterization state corresponding to the acknowledge character signal, in response to determining the characterization state corresponding to the acknowledge character signal as a non-response state, performing step 320, and in response to determining the characterization state corresponding to the acknowledge character signal as a response state, performing step 321.

Step 320: Exiting takeover of the first integrated circuit bus between the master device and the slave device, and ending an interaction between the master device and the slave device based on the first integrated circuit bus.

Step 321: Obtaining a highest bit of a next byte sent by the master device to the slave device, and recording the highest bit of the next byte to a serial data line register, sending the highest bit of the next byte to the slave device, re-detecting whether the slave device enters the clock stretching state, and returning to a transparent transmission mode until communication between the master device and the slave device is ended.

In some embodiments, an apparatus for processing clock stretching in a transparent transmission mode of an integrated circuit bus is further provided. The apparatus is configured to implement the foregoing embodiments. What has already been described will not be repeated. As used below, a term “module” may implement a combination of software and/or hardware with a predetermined function. Although the apparatus described in the following embodiments are implemented by software, implementation by hardware or a combination of software and hardware is possible and envisioned.

Figure 6:
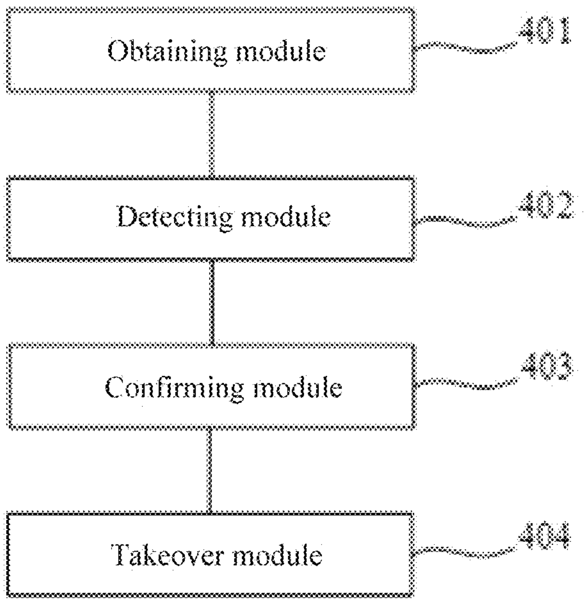
FIG. 6 is a structural block diagram of an apparatus for processing clock stretching in a transparent transmission mode of an integrated circuit bus according to embodiments of the present application.

Some embodiments provide an apparatus for processing clock stretching in a transparent transmission mode of an integrated circuit bus, which is applied to a complex programmable logic device. As shown in FIG. 6, the apparatus includes:

- an obtaining module 401, configured to obtain target data transmitted by a master device to a slave device based on a first integrated circuit bus;
- a detecting module 402, configured detect, according to the target data, whether the master device has already completed sending a byte of data to the slave device;
- a confirming module 403, configured to confirm, in response to determining that the master device has already completed sending the byte of data to the slave device, that the master device is about to send an acknowledge character bit to the slave device; and
- a takeover module 404, configured to take over the first integrated circuit bus between the master device and the slave device, disable a transparent transmission mode between the master device and the slave device, and control the master device and/or the slave device.

In some implementations, the takeover module 404 is configured to control, based on second integrated circuit bus between the complex programmable logic device and the master device, the master device to be in a waiting state, detect, based on a third integrated circuit bus between the complex programmable logic device and the slave device, whether the slave device enters a clock stretching state to obtain a first detection result, and control the master device and the slave device according to the first detection result.

In some implementations, the takeover module 404 is configured to control, based on the second integrated circuit bus between the complex programmable logic device and the master device, the master device to enter the clock stretching state, and pull down a first serial clock line signal corresponding to the master device to enable the master device to be in the waiting state.

In some implementations, the takeover module 404 is configured to continuously pull up the second serial clock line signal corresponding to the slave device, send a third serial clock line signal corresponding to an acknowledge character bit to the slave device, detect whether the second serial clock line signal corresponding to the slave device is at a high level to obtain a second detection result, and determine, according to the second detection result, whether the slave device enters a clock stretching state to obtain the first detection result.

In some implementations, the takeover module 404 is configured to determine, in response to determining that the second detection result is that the second serial clock line signal corresponding to the slave device is at the high level, that the slave device does not enter the clock stretching state or the slave device has already exited the clock stretching state to obtain the first detection result.

In some implementations, the takeover module 404 is configured to determine, in response to determining that the second detection result is that the second serial clock line signal corresponding to the slave device is at a low level, that the slave device enters the clock stretching state to obtain the first detection result.

In some implementations, the takeover module 404 is configured to: start a timeout timer in response to determining that the first detection result is that the slave device enters the clock stretching state, where the timeout timer is preset with a preset duration, detect, based on the timeout timer, and whether a time for the slave device to enter the clock stretching state exceeds the preset duration to obtain the third detection result, and control the master device and/or the slave device according to the third detection result.

In some implementations, the takeover module 404 is configured to continuously detect whether the second serial clock line signal corresponding to the slave device changes to the high level to obtain a fourth detection result, and determine, according to the fourth detection result, whether the time for the slave device to enter the clock stretching state exceeds the preset duration to obtain the third detection result.

In some implementations, the takeover module 404 is configured to determine, in response to determining that the fourth detection result is that the second serial clock line signal corresponding to the slave device changes to the high level within the preset duration, that the time for the slave device to enter the clock stretching state does not exceed the preset duration to obtain the third detection result.

In some implementations, the takeover module 404 is configured to determine, in response to determining that the fourth detection result is that the second serial clock line signal corresponding to the slave device does not change to the high level within the preset duration, that the time for the slave device to enter the clock stretching state exceeds the preset duration to obtain the third detection result.

In some implementations, the takeover module 404 is configured to determine, in response to determining that the third detection result is that the time for the slave device to enter the clock stretching state exceeds to the preset duration, that the slave device is in an abnormal state, output high impedance to the master device based on the third integrated circuit bus between the complex programmable logic device and the master device, and pull up the first serial clock line signal corresponding to the master device.

In some implementations, the takeover module 404 is configured to wait for the slave device to exit the clock stretching state when it is determined, in response to determining that the third detection result is that the time for the slave device to enter the clock stretching state does not exceed the preset duration, that the slave device is in a normal state.

In some implementations, the takeover module 404 is configured to pulling up, in response to determining that the first detection result is that the slave device does not enter the clock stretching state or has already exited the clock stretching state, the second serial clock line signal corresponding to the slave device, record the acknowledge character signal returned by the slave device to the master device to an acknowledge character register corresponding to the slave device, control the master device to exit the waiting state, and return and output, based on the second integrated circuit bus between the complex programmable logic device and the master device, the acknowledge character signal to the master device as an acknowledge character bit.

In some implementations, the takeover module 404 is configured to pull up a first serial clock line signal corresponding to the master device, and release a clock stretching state corresponding to the master device.

In some implementations, the takeover module 404 is configured to: identify the acknowledge character signal, determine a characterization state corresponding to the acknowledge character signal according to an identification result, where the characterization state includes a response state and a non-response state, and process the first integrated circuit bus between the master device and the slave device according to the characterization state corresponding to the acknowledge character signal.

In some implementations, the takeover module 404 is configured to exit takeover of the first integrated circuit bus between the master device and the slave device in response to that the characterization state corresponding to the acknowledge character signal is the non-response state, and end an interaction between the master device and the slave device based on the first integrated circuit bus, where the non-response state is configured to characterize that the slave device does not process the target data sent by the master device.

In some implementations, the takeover module 404 is configured to: obtain, in response to that the characterization state corresponding to the acknowledge character signal is the response state, a highest bit of a next byte sent by the master device to the slave device, and record the highest bit of the next byte to a serial data line register, where the response state is configured to characterize that the slave device processes the target data sent by the master device, send the highest bit of the next byte to the slave device, re-detect whether the slave device enters the clock stretching state, and return to a transparent transmission mode until the communication between the master device and the master device is ended.

In an apparatus for processing clock stretching in a transparent transmission mode of an integrated circuit bus according to these embodiments of the present application, target data transmitted by a master device to a slave device based on a first integrated circuit bus is obtained, and then, whether the master device has already completed sending a byte of data to the slave device is detected according to the target data. Accuracy of a detected result of whether the master device has already completed sending the byte of data to the slave device is ensured. In response to determining that the master device has already completed sending the byte of data to the slave device, it is confirmed that the master device is about to send an acknowledge character bit to the slave device. Accuracy of a confirmed result that the first integrated circuit bus is about to enter an acknowledge character bit state is ensured. The first integrated circuit bus between the master device and the slave device is taken over, the transmission mode between the master device and the slave device is disabled, and the master device and/or the slave device is controlled, to avoid generating short pulses on a first serial clock line signal corresponding to the master device and a second serial clock line signal corresponding to the slave device after the master device sends the acknowledge character bit to the slave device, thereby avoiding an impact on normal communication between the master device and the slave device. Stability of a first integrated circuit bus interaction is ensured without changing original hardware connection architecture, and continuity and stability of a BMC in a server, that is, a master device management peripheral, are increased.

In some embodiments, the apparatus for processing clock stretching in a transparent transmission mode of an integrated circuit bus is presented in a form of functional units, where the units here refer to ASIC circuits, processors and memories that execute one or more software or fixed programs, and/or another device that may provide the foregoing functions.

Further functional descriptions of the foregoing modules and units are the same as those in the foregoing corresponding embodiments. Details are not described herein.

Figure 7:
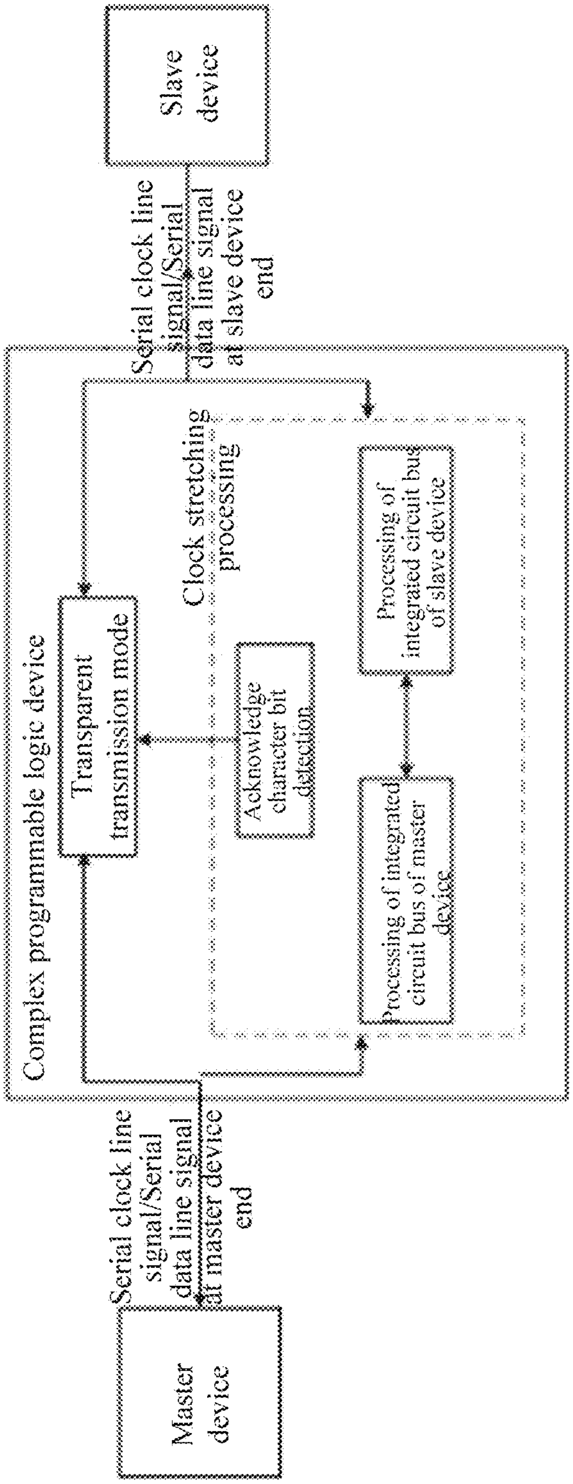
FIG. 7 is a schematic structural diagram of a complex programmable logic device according to embodiments of the present application.

These embodiments of the present application further provide a complex programmable logic device, having the foregoing apparatus for processing clock stretching in a transparent transmission mode of an integrated circuit bus shown in FIG. 6. The complex programmable logic device may be shown in FIG. 7.

These embodiments of the present application further provide an electronic device. The electronic device may be a server, or may be a mobile terminal. The electronic device includes the complex programmable logic device shown in FIG. 7.

Figure 8:
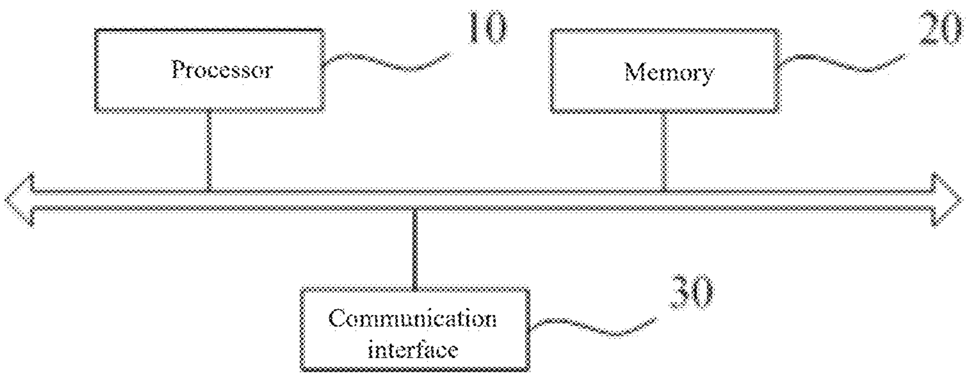
FIG. 8 is a schematic structural diagram of electronic device hardware according to embodiments of the present application.

Refer to FIG. 8, which is a schematic structural diagram of an electronic device according to these embodiments of the present application. As shown in FIG. 8, the electronic device includes: one or more processors 10, memories 20 associated with the one or more processors 10, and interfaces configured to connect various parts, including high-speed interfaces and low-speed interfaces. Various parts are communicatively connected with one another by using different bus interfaces, and may be mounted on a public mainboard, or mounted in another mode as required. The processor may process instructions executed in the electronic device, including the instructions stored in the memory or on the memory to display graphic information of a GUI on an external output apparatus (such as a display device coupled to the interface). In some implementations, if required, a plurality of processors and/or a plurality of buses may be used together with a plurality of memories. Similarly, a plurality of electronic devices may be connected. Various devices provide part necessary operations (for example, serving as a server array, a group of blade servers, or a multi-processor system). In FIG. 8, one processor 10 is used as an example.

The processor 10 may be a central processing unit, a network processor, or a combination thereof. The processor 10 may further include a hardware module. The foregoing hardware module may be a dedicated integrated circuit, a programmable logic device, or a combination thereof. The foregoing programmable logic device may be a complex programmable logic device, a field programmable logic gate array, a general-purpose array logic, or any combination thereof.

The memory 20 stores computer-readable instructions executable by at least one processor 10 to enable the at least one processor 10 to perform the method shown in the foregoing embodiments.

The memory 20 may include a program storage area and a data storage area. The program storage area may store an operating system, an application required by at least one function; and the data storage area may store data created by use of an electronic device according to presentation of an applet landing page. In addition, the memory 20 may include a high-speed random-access memory, and may further include a non-volatile memory, such as at least one magnetic disk storage device, a flash memory device, or another non-volatile solid-state storage device. In some implementations, the memory 20 include memories remotely disposed relative to the processor 10, and these remote memories may be connected to the electronic device through a network. Examples of the foregoing network include, but are not limited to, the Internet, an intranet, a local area network, a mobile communication network, and a combination thereof.

The memory 20 may include a volatile memory, for example, a random-access memory; the memory may include a non-volatile memory, for example, a flash memory, a hard disk, or a solid-state drive; and the memory 20 may include a combination of the foregoing types of memories.

The electronic device further includes a communication interface 30, which is configured for the electronic device to communicate with another device or a communication network.

These embodiments of the present application further provide a non-volatile computer-readable storage medium. The foregoing method according to these embodiments of the present application may be implemented in hardware or firmware, or may be implemented to be capable of being recorded in the storage medium, or may be implemented as computer devices that are downloaded through a network, originally stored in a remote storage medium or a non-volatile machine-readable storage medium, and will be stored in a local storage medium, whereby the method described herein may be processed by such software stored in a storage medium of a general-purpose computer, dedicated processor, or programmable or dedicated hardware. The storage medium may be a magnetic disk, a compact disk, a read-only storage memory, a random storage memory, a flash memory, a hard disk or a solid-state drive. Further, the storage medium may further a combination of the foregoing types of memories. It may be understood that a computer, a processor, a microprocessor controller or a programmable hardware include a storage component capable of storing or receiving software or computer codes. The method shown in the foregoing embodiments may be implemented when the software or computer codes are accessed and executed by the computer, the processor, or the hardware.

Although the embodiments of the present application have been described in combination with the accompanying drawings, a person of ordinary skill in the art may make various modifications and variations without departing from the spirit and scope of the present application, and such modifications and variations fall within the scope defined by the appended claims.

The invention claimed is:

1. A method for processing clock stretching in a transparent transmission mode of an integrated circuit bus, being applied to a complex programmable logic device, and comprising:

obtaining target data transmitted by a master device to a slave device based on a first integrated circuit bus;

detecting, according to the target data, whether the master device has already completed sending a byte of data to the slave device;

confirming, in response to determining that the master device has already completed sending the byte of data to the slave device, that the master device is to send an acknowledge character bit to the slave device; and taking over the first integrated circuit bus between the master device and the slave device, disabling a transparent transmission mode between the master device and the slave device, and controlling at least one of the master device and the slave device.

2. The method according to claim 1, wherein the taking over the first integrated circuit bus between the master device and the slave device, disabling a transparent transmission mode between the master device and the slave device, and controlling at least one of the master device and the slave device comprises:

controlling, based on a second integrated circuit bus between the complex programmable logic device and the master device, the master device to be in a waiting state;

detecting, based on a third integrated circuit bus between the complex programmable logic device and the slave device, whether the slave device enters a clock stretching state to obtain a first detection result; and controlling the at least one of the master device and the slave device according to the first detection result.

3. The method according to claim 2, wherein the controlling, based on a second integrated circuit bus between the complex programmable logic device and the master device, the master device to be in a waiting state comprises:

controlling, based on the second integrated circuit bus between the complex programmable logic device and the master device, the master device to enter the clock stretching state, and pulling down a first serial clock line signal corresponding to the master device to enable the master device to be in the waiting state.

4. The method according to claim 2, wherein the detecting, based on a third integrated circuit bus between the complex programmable logic device and the slave device, whether the slave device enters a clock stretching state to obtain a first detection result comprises:

continuously pulling up a second serial clock line signal corresponding to the slave device, and sending a third serial clock line signal corresponding to the acknowledge character bit to the slave device;

detecting whether the second serial clock line signal corresponding to the slave device is at a high level to obtain a second detection result; and determining, according to the second detection result, whether the slave device enters the clock stretching state to obtain the first detection result.

5. The method according to claim 4, wherein the determining, according to the second detection result, whether the slave device enters the clock stretching state to obtain the first detection result comprises:

determining, in response to determining that the second detection result indicates that the second serial clock line signal corresponding to the slave device is at the high level, that the slave device does not enter the clock stretching state or the slave device has already exited the clock stretching state to obtain the first detection result.

6. The method according to claim 5, wherein the determining, according to the second detection result, whether the slave device enters the clock stretching state to obtain the first detection result comprises:

determining, in response to determining that the second detection result indicates that the second serial clock line signal corresponding to the slave device is at a low level, that the slave device enters the clock stretching state to obtain the first detection result.

7. The method according to claim 2, wherein the controlling the at least one of the master device and the slave device according to the first detection result comprises:

starting a timeout timer in response to determining that the first detection result indicates that the slave device enters the clock stretching state, wherein the timeout timer is set with a preset duration;

detecting, based on the timeout timer, whether a time for the slave device to enter the clock stretching state exceeds the preset duration to obtain a third detection result; and controlling the at least one of the master device and the slave device according to the third detection result.

8. The method according to claim 7, wherein the detecting, based on the timeout timer, whether a time for the slave device to enter the clock stretching state exceeds the preset duration to obtain a third detection result comprises:

continuously detecting whether a second serial clock line signal corresponding to the slave device changes to a high level within the preset duration to obtain a fourth detection result; and determining, according to the fourth detection result, whether the time for the slave device to enter the clock stretching state exceeds the preset duration to obtain the third detection result.

9. The method according to claim 8, wherein the determining, according to the fourth detection result, whether the time for the slave device to enter the clock stretching state exceeds the preset duration to obtain the third detection result comprises:

determining, in response to determining that the fourth detection result indicates that the second serial clock line signal corresponding to the slave device changes to the high level within the preset duration, that the time for the slave device to enter the clock stretching state does not exceed the preset duration to obtain the third detection result.

10. The method according to claim 9, wherein the determining, according to the fourth detection result, whether the time for the slave device to enter the clock stretching state exceeds the preset duration to obtain the third detection result comprises:

determining, in response to determining that the fourth detection result indicates that the second serial clock line signal corresponding to the slave device does not change to the high level within the preset duration, that the time for the slave device to enter the clock stretching state exceeds the preset duration to obtain the third detection result.

11. The method according to claim 7, wherein the controlling the at least one of the master device and the slave device according to the third detection result comprises:

determining, in response to determining that the third detection result indicates that the time for the slave device to enter the clock stretching state exceeds the preset duration, that the slave device is in an abnormal state; and outputting, based on the third integrated circuit bus between the complex programmable logic device and the master device, high impedance to the master device, and pulling up a first serial clock line signal corresponding to the master device.

12. The method according to claim 11, wherein the controlling the at least one of the master device and the slave device according to the third detection result comprises:

waiting for the slave device to exit the clock stretching state when it is determined, in response to determining that the third detection result indicates that the time for the slave device to enter the clock stretching state does not exceed the preset duration, that the slave device is in a normal state.

13. The method according to claim 7, wherein the controlling the at least one of the master device and the slave device according to the first detection result comprises:

pulling up, in response to determining that the first detection result indicates that the slave device does not enter the clock stretching state or has already exited the clock stretching state, a second serial clock line signal corresponding to the slave device, and recording an acknowledge character signal returned by the slave device to the master device to an acknowledge character register corresponding to the slave device;

controlling the master device to exit the waiting state; and returning and outputting, based on the second integrated circuit bus between the complex programmable logic device and the master device, the acknowledge character signal to the master device as an acknowledge character bit.

14. The method according to claim 13, wherein the controlling the master device to exit the waiting state comprises:

pulling up a first serial clock line signal corresponding to the master device, and releasing a clock stretching state corresponding to the master device.

15. The method according to claim 13, whereinafter the returning and outputting, based on the second integrated circuit bus between the complex programmable logic device and the master device, the acknowledge character signal to the master device as an acknowledge character bit, the method further comprises:

identifying the acknowledge character signal;

determining, according to an identification result, a characterization state corresponding to the acknowledge character signal, wherein the characterization state comprises a response state and a non-response state; and processing the first integrated circuit bus between the master device and the slave device according to the characterization state corresponding to the acknowledge character signal.

16. The method according to claim 15, wherein the processing the first integrated circuit bus between the master device and the slave device according to the characterization state corresponding to the acknowledge character signal comprises:

exiting takeover of the first integrated circuit bus between the master device and the slave device in response to the characterization state corresponding to the acknowledge character signal being the non-response state, and ending an interaction between the master device and the slave device based on the first integrated circuit bus, wherein the non-response state is configured to characterize that the slave device does not process the target data sent by the master device.

17. The method according to claim 16, further comprising:

obtaining, in response to the characterization state corresponding to the acknowledge character signal being the response state, a highest bit of a next byte sent by the master device to the slave device, and recording the highest bit of the next byte to a serial data line register, wherein the response state is configured to characterize that the slave device processes the target data sent by the master device;

sending the highest bit of the next byte to the slave device;

re-detecting whether the slave device enters the clock stretching state; and returning to the transparent transmission mode until communication between the master device and the slave device is ended.

18. An electronic device, comprising:

a complex programmable logic device, configured to perform a method for processing clock stretching in a transparent transmission mode of an integrated circuit bus, comprising:

obtaining target data transmitted by a master device to a slave device based on a first integrated circuit bus;

detecting, according to the target data, whether the master device has already completed sending a byte of data to the slave device;

confirming, in response to determining that the master device has already completed sending the byte of data to the slave device, that the master device is to send an acknowledge character bit to the slave device; and taking over the first integrated circuit bus between the master device and the slave device, disabling a transparent transmission mode between the master device and the slave device, and controlling at least one of the master device or the slave device.

19. A non-transitory computer-readable storage medium, wherein the non-transitory computer-readable storage medium has computer instructions stored therein, wherein the computer instructions are configured to enable a computer to perform a method for processing clock stretching in a transparent transmission mode of an integrated circuit bus, comprising:

obtaining target data transmitted by a master device to a slave device based on a first integrated circuit bus;

detecting, according to the target data, whether the master device has already completed sending a byte of data to the slave device;

confirming, in response to determining that the master device has already completed sending the byte of data to the slave device, that the master device is to send an acknowledge character bit to the slave device; and taking over the first integrated circuit bus between the master device and the slave device, disabling a transparent transmission mode between the master device and the slave device, and controlling at least one of the master device or the slave device.

20. The method according to claim 1, wherein the detecting, according to the target data, whether the master device has already completed sending a byte of data to the slave device comprises:

identifying, by the complex programmable logic device, the target data to determine data volume corresponding to the target data; and detecting, according to the data volume corresponding to the target data, whether the master device has already completed sending the byte of data to the slave device.

* * * * *